Feb. 7, 1956  E. LEWIT  2,733,829
CLOSURE FOR NARROW NECKED SMALL CONTAINERS
Filed April 9, 1953
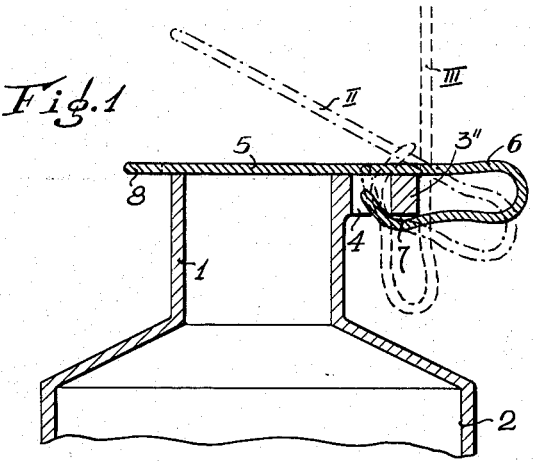
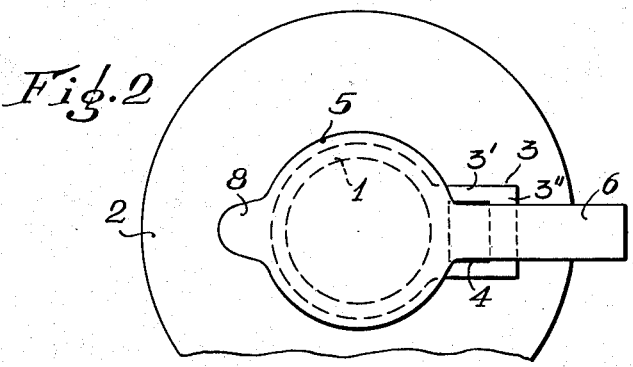
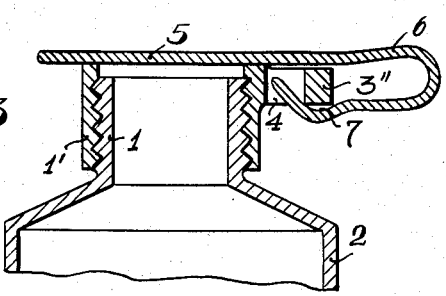
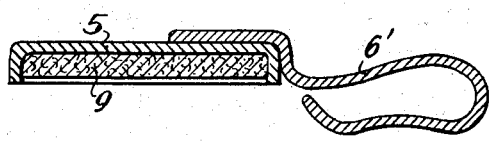
INVENTOR
EPHRAIM LEWIT
BY

United States Patent Office 2,733,829
Patented Feb. 7, 1956

2,733,829

CLOSURE FOR NARROW NECKED SMALL CONTAINERS

Ephraim Lewit, Tel Aviv, Israel

Application April 9, 1953, Serial No. 347,658

2 Claims. (Cl. 220—31)

The invention relates to tiltable lids for diverse kinds of containers, more especially for collapsible tubes for pasty or liquid contents. It is also concerned with containers provided with tiltable lids.

The object of the invention is to provide a tiltable lid with a springy hinge tending to keep the lid in closed position but tending also to retain the lid in open position whenever it is fully opened, so as not to obstruct the outflow from the container or the exit of pasty material therefrom. It is a further object of this invention to provide such a lid which can be set on such tubes, when their original closure, such as a screw cap, has been removed. A further object of the invention is to make the lid firmly closing on the neck. A further object is to make the lid secure on its connection, so as to prevent lateral movement of the lid.

The invention will be more readily understood from the following detailed description with reference to the accompanying drawing wherein Fig. 1 shows a vertical section of the neck of a container which is equipped with the new lid, and Fig. 2 is a plan view thereof, while Fig. 3 represents a vertical section of a modification of the new closure.

Fig. 4 shows a modified form of a lid.

Referring first to Figs. 1 and 2, the numeral 1 designates the neck of a container 2. Neck 1 has a laterally projecting quadrangular plate 3 provided with a quadrangular cut-out 4, so that this plate has the shape of a three-sided horizontal frame with lateral sides 3′ and a far side 3″. The opening of the neck is closed by a flat lid 5. Lid 5 has an integral tailpiece 6 made of a springy strip bent around the said side 3″ of the projection 3 of the neck 1. The bent strip has the shape of a hook or loop and clamps the side 3″ from above and below. Strip 6 is bent into a wide loop, the bow of which comes to lie somewhat beyond and away from the outer part 3″. strip 6 and side 3″ thus constitute a hinge for the lid 5, side 3″ being the bolt of the hinge about which the lid can be turned from its horizontal position into its vertical position III indicated in dotted lines in Fig. 1. The "bolt" 3″ pressing on the end of the tail piece 6 urges the lid 5 down onto the neck, and spreads the two arms of the tail 6 asunder during lifting. Thus this spreading, due to the fact that the arms are forced apart to the distance of the diagonal of the bolt, (see position II in Fig. 1) counteracts any unintentional opening of the lid. After overcoming this counteracting tension and opening the lid, the vertical sides of bolt 3″ lie between the arms of the tail piece of the now open lid. If the lid is to be closed again i. e. to be turned down, the said arms are again to be spread and only after an intentional overcoming of the counteracting tension of said arms the lid can be closed. Thus the lid is opened or closed by snap action and will not be fixable at any intermediate position such as that shown in Fig. 1 and designated as II. In tail piece 6 where it passes around bolt 3″ at the lower side of the latter, there is a depression 7 which inhibits a dislocation of the lid. The width of the cut-out 4 is equal to the width of the tail-piece thus assuring a suitable fit of the tail piece in said cut-out.

According to the modification shown in Fig. 3 the lid is not hinged directly to the neck of the container, but to a short tubular member 1′ which is screwable to the neck 1 of the container 2. But instead of screwing said member on said neck any other connection known per se will do.

In both embodiments of the invention the lateral projection 3 is a vital feature of the invention, since it allows a full opening of the lid, so as not to interfere with the stream of the substance dispensed.

A tongue 8 may be provided on the front side of the lid, so as to facilitate its opening and closing.

The lid can be opened most conveniently by pressure, in the direction of arrow $x$ on the extended bow of the tailpiece 6, said extension offering the required leverage. Lid 5 need not be flat as shown in Figs. 1 and 3; it may be dished as shown in Fig. 4 to accommodate in its hollow a washer 9, or to fit over the edge of the neck, and the tailpiece 6′ may be made separated and fixed to the lid by soldering or otherwise.

The upper face of projection 3 need not be flush with the edge of the neck 1 or the tubular member 1′. Said face may lie in a plane slightly lower, as shown in Fig. 3, thereby assuring a tight fit of lid 5 on said edge.

What I claim is:

1. In containers having hinged to their neck a tiltable lid, a lateral extension of the neck forming a horizontal quadrangular bolt or pivot of the hinge, a springy tail piece on the lid bent around the bolt and constituting two arms clamping the bolt, and a depression at least in one of these arms, the bolt being partly seated in that depression, the bend of the tail piece being shaped as a wide loop the bow of which comes to lie beyond and away from the bolt thus constituting a lever for tilting the lid.

2. A short cylindrical tubing adapted to be fixed on the neck of containers, a tiltable lid hinged to that tubing, a lateral extension of the tubing, forming a horizontal bolt of the hinge, a springy tail piece on the lid bent around the bolt and constituting two arms clamping the bolt, a depression at least in one of these arms, the bolt being partly seated in that depression and the bend of the tail piece being shaped as a wide loop the bow of which comes to lie beyond and away from the bolt, thus constituting a lever for tilting the lid.

References Cited in the file of this patent

UNITED STATES PATENTS

| 753,381 | Eigen | Mar. 1, 1904 |
| 760,890 | Mackinder | May 24, 1904 |
| 876,784 | Ellis | Jan. 14, 1908 |
| 1,166,551 | Simmons | Jan. 4, 1916 |
| 1,470,686 | Carpenter | Oct. 16, 1923 |
| 1,494,165 | Hall | May 13, 1924 |
| 1,597,421 | Ball | Aug. 24, 1926 |
| 1,985,587 | Storrs, Jr. | Dec. 25, 1934 |
| 2,011,660 | Sparkes | Aug. 20, 1935 |
| 2,342,477 | Magnenat | Feb. 22, 1944 |
| 2,345,719 | Weil, Jr. | Apr. 4, 1944 |

FOREIGN PATENTS

| 19,005 | Austria | Jan. 25, 1905 |
| 616,780 | Great Britain | Jan. 26, 1949 |